United States Patent
Handshaw et al.

(10) Patent No.: US 8,342,409 B2
(45) Date of Patent: Jan. 1, 2013

(54) OBJECT PROXIMITY SENSOR RECESSED INTO IMAGING READER

(75) Inventors: Darran Handshaw, Sound Beach, NY (US); Yuly Mitelman, Stony Brook, NY (US); Eric Trongone, West Babylon, NY (US); Igor Vinogradov, Oakdale, NY (US); Wancheng Zhao, Selden, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 161 days.

(21) Appl. No.: 12/900,829

(22) Filed: Oct. 8, 2010

(65) Prior Publication Data

US 2012/0085824 A1   Apr. 12, 2012

(51) Int. Cl.
*G06K 7/10* (2006.01)
(52) U.S. Cl. .......... 235/462.31; 235/462.43; 235/462.45
(58) Field of Classification Search ............. 235/462.31, 235/462.43, 462.45, 462.46
See application file for complete search history.

(56) References Cited

U.S. PATENT DOCUMENTS

| 5,280,162 | A | 1/1994 | Marwin |
| 5,449,891 | A | 9/1995 | Giebel |
| 6,168,081 | B1 * | 1/2001 | Urano et al. ............. 235/462.27 |
| 7,597,263 | B2 | 10/2009 | Vinogradov et al. |
| 2005/0023358 | A1 * | 2/2005 | Byun et al. ............... 235/462.45 |
| 2006/0289654 | A1 * | 12/2006 | Robinson et al. ........ 235/462.46 |

* cited by examiner

*Primary Examiner* — Ahshik Kim
(74) *Attorney, Agent, or Firm* — Nong-Qiang Fan (57) ABSTRACT

An electro-optical imaging reader includes a chassis mounted in a housing, a window spaced from a rear wall of the chassis, an imaging module for capturing return light from a target through the window over an imaging field of view, a controller for operating the reader in a standby state in which no target is read, and for processing the captured return light to read the target during a reading state, and an object sensing assembly supported by the rear chassis wall and spaced from the window. The object sensing assembly senses the presence of an object bearing the target in front of the window by detecting return sensing light from the object through the window over a sensing field of view that at least partially overlaps the imaging field of view, and triggers the controller to change from the standby state to the reading state upon such detection.

20 Claims, 6 Drawing Sheets

OBJECT PROXIMITY SENSOR RECESSED INTO IMAGING READER

DESCRIPTION OF THE RELATED ART

Solid-state imaging systems or imaging readers have been used, in both handheld and/or hands-free modes of operation, to electro-optically read targets to be decoded, such as one-dimensional bar code symbols, particularly of the Universal Product Code (UPC) symbology having a row of bars and spaces spaced apart along a scan direction, as well as two-dimensional symbols, such as the Code 49 symbology having a plurality of vertically stacked rows of bar and space patterns in a single symbol, and even non-symbol targets to be imaged, such as documents.

The known imaging reader includes a housing either held by an operator in a handheld mode and/or supported on a support surface in a hands-free mode, a front window supported by the housing and aimed at, or facing the target, during reading, and an imaging engine or module supported by the housing and having a chassis bounding an optical compartment in which are accommodated a solid-state imager with a sensor array of photocells or light sensors that correspond to image elements or pixels of the imager, and an imaging lens assembly for capturing return light scattered and/or reflected from the target being imaged along an imaging axis through the window, and for projecting the return light onto the sensor array to initiate capture of an image of the target, over an imaging field of view during a reading state of operation. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the imaging field of view. These electrical signals are decoded by a programmed microprocessor or controller into data indicative of the symbol being read, or into a picture of the target, during the reading state. Upon a successful decode, an indicator, such as a beeper or an indicating LED, supported by the housing is energized.

It is therefore known to use the imager for capturing a monochrome image of a target or symbol. It is also known to use the imager with multiple buried channels for capturing a full color image of the target or symbol. It is common to provide a two-dimensional CCD with a 640×480 resolution commonly found in VGA monitors, although other resolution sizes are possible.

In order to increase the amount of the return light captured by the sensor array, especially in dimly lit environments and/or at far range reading, the optical compartment of the known imaging module may also accommodate an illuminating light assembly for illuminating the target with illumination light from an illuminating light source, e.g., one or more light emitting diodes (LEDs) and illuminating lenses, for reflection and scattering therefrom, and an aiming light assembly for projecting an aiming light pattern or mark with aiming light from an aiming light source, e.g., an aiming laser or LEDs, through aiming lenses on the target prior to imaging.

In the hands-free mode of operation, the target on an object must be moved into, and positioned in, the imaging field of view to effect reading. To reduce power consumption and prolong the working lifetime of the hands-free reader, the reader is typically maintained in a non-reading, e.g., a low-power or off, standby state when not actively reading a target. To initiate reading and wake-up the reader, it is known to provide the reader with an object sensing assembly to sense the presence of the object bearing the target that has entered the imaging field of view, and to automatically convert and switch the reader from the standby state to the reading state.

For this purpose, the object sensing assembly typically employs an infrared (IR) light emitting diode (LED) or a near IR LED to emit, either pulsed or continuous, low level IR light, which is not readily seen by the human eye and, hence, will not disturb an operator or customers in the vicinity of the reader while operating in the standby state. Preferably, the IR light is at the border of the optical band of human eye sensitivity. The IR light reflects or scatters off the target, and the return IR light is detected by an IR sensor over an object sensing field of view. The IR sensor, in turn, signals the controller to automatically switch out of the standby state. Reading performance is enhanced when this switchover occurs rapidly.

The IR sensor is typically mounted inside the front of the housing adjacent the front window to avoid interference by internal reflections of the emitted IR light off interior surfaces and internal components of the reader. Although the known object-sensing, hands-free, imaging reader is generally satisfactory for its intended purpose, the forward mounting of the IR sensor makes it susceptible to interference with ambient sunlight entering the front window. Also, the forward mounting of the IR sensor makes it more difficult to match the object sensing field of view with the imaging field of view for increased reading performance.

SUMMARY OF THE INVENTION

The present invention relates to an imaging reader for electro-optically reading targets on objects by image capture. The reader includes a housing and a chassis mounted in the housing and having chassis walls bounding a front chassis opening and a chassis compartment. One of the chassis walls is a rear chassis wall. A front window overlies the front chassis opening and is spaced from the rear chassis wall. An imaging module in the chassis compartment captures return imaging light from a target through the window over an imaging field of view. The imaging module preferably includes a solid-state imager with a sensor array of photocells or light sensors, e.g., a CCD or CMOS device, and an imaging lens assembly. A controller operates the reader in a standby state of operation in which no target is read, and processes the captured return imaging light to read the target during a reading state of operation.

In accordance with one aspect of this invention, an object sensing assembly is recessed within the reader and is supported by the rear chassis wall in spaced relation away from the window. The object sensing assembly senses the presence of an object bearing the target in front of the window by detecting return sensing light from the object through the window over a sensing field of view that at least partially overlaps the imaging field of view, and also triggers the controller to change from the standby state to the reading state upon detection of the return sensing light. The rearward, recessed mounting of the object sensing assembly makes it less susceptible to interference with ambient sunlight entering the front window. Also, the rearward, recessed mounting of the object sensing assembly makes it easier to match the object sensing field of view with the imaging field of view for increased reading performance.

Preferably, the object sensing assembly includes an infrared (IR) light emitter to emit IR sensing light and an IR sensor to detect the return IR sensing light. The IR emitter and the IR sensor are both supported, preferably in side-by-side relation, by the rear chassis wall. The rear chassis wall is advantageously rearwardly tilted relative to a horizontal axis, in which case, the IR sensing light travels along a direct path that extends from the rear chassis wall upwardly relative to the horizontal axis through the window, and the return IR sensing light travels along a direct path that extends through the window downwardly relative to the horizontal axis to the rear chassis wall. Preferably, the rear chassis wall has a pocket in which the IR sensor is received, and the pocket has pocket walls bounding an aperture through which the return IR sensing light passes. Advantageously, the IR emitter and the IR sensor are directly mounted on a support, e.g., a flexible printed circuit board (PCB), and the flexible PCB is directly mounted on the chassis.

The object sensing assembly preferably includes an optical bandpass filter for permitting only the return IR sensing light to reach the IR sensor. The sensor array preferably lies in a horizontal plane, and the imaging lens assembly projects the captured return imaging light onto the sensor array along an upright axis perpendicular to the plane of the sensor array. A mirror in the chassis compartment directs the return imaging light along a folded path to the imaging lens assembly. A zone of the sensing field of view is positioned outside of the imaging field of view to enable the object to be sensed prior to entry of the target into the imaging field of view. A base advantageously supports the housing in a hands-free mode of operation on a support surface, such as a countertop.

Another feature of the present invention resides in a method of electro-optically reading targets on objects by image capture. The method is performed by mounting a chassis in a housing, configuring the chassis with chassis walls bounding a front chassis opening and a chassis compartment, one of the chassis walls being a rear chassis wall, overlying the front chassis opening with a window spaced from the rear chassis wall, capturing return imaging light from the target through the window over an imaging field of view, operating the reader in a standby state of operation in which no target is read, processing the captured return imaging light to read the target during a reading state of operation, sensing the presence of an object bearing the target in front of the window with an object sensing assembly supported on the rear chassis wall and spaced from the window by detecting return sensing light from the object through the window over a sensing field of view that at least partially overlaps with the imaging field of view, and triggering the controller to change from the standby state to the reading state upon detection of the return sensing light.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
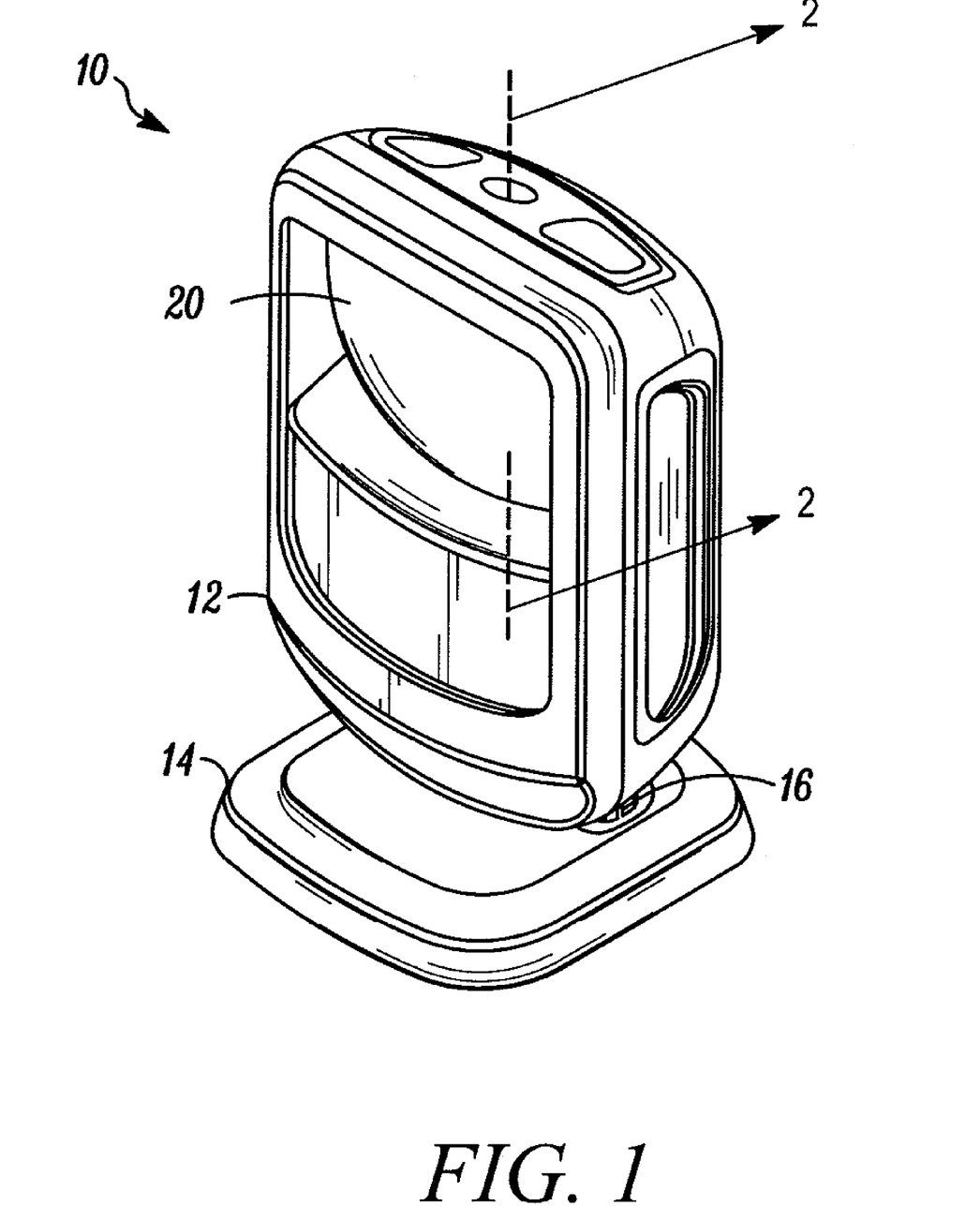
FIG. 1 is a perspective view of a portable imaging reader in a hands-free mode operative for electro-optically reading targets or symbols on objects by image capture in accordance with this invention.

Reference numeral 10 generally identifies an imaging reader for electro-optically reading targets, such as bar code symbols, on objects, such as consumer products to be processed at a point-of-sale workstation, by image capture. The reader 10 includes a box-like housing 12 mounted on a support base 14 that rests on a countertop or like planar support surface in a hands-free mode of operation. The reader 10 can also be lifted off the support surface in a handheld mode of operation. A ratchet-type tilting mechanism 16 enables the housing 12 to be tilted to, and locked at, a desired tilt angle relative to the base 14. Other housing configurations, such as a gun-like configuration, are contemplated for use with this invention.

Figure 2:
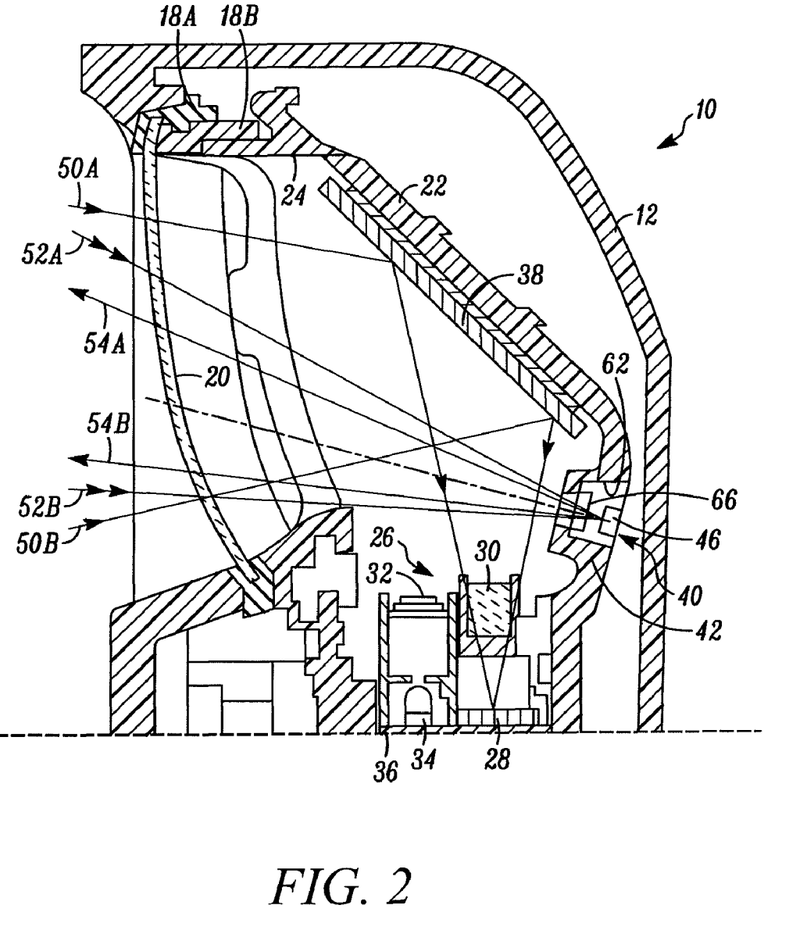
FIG. 2 is an enlarged sectional view taken on the line 2-2 of FIG. 1.

A light-transmissive, front window 20 is supported by the housing 12. The window 20 is a generally rectangular, injection-molded part, preferably of spherical contour, and is constituted of a non-polycarbonate, acrylic material that has good molding characteristics and good scratch resistance. As best seen in FIG. 2, rubber bumpers 18A, 18B peripherally surround the window 20 and provide a measure of protection from shock forces.

As also shown in FIG. 2, a chassis 22 is mounted in the housing 12 and has chassis walls bounding an optical compartment 24. The front window 20 overlies a front opening of the optical compartment 24. An imaging engine or module 26 is mounted in the optical compartment 24 for capturing return imaging light from the target through the window 20. The imaging module 26 includes a solid-state imager 28 with a sensor array of photocells or light sensors, e.g., a CCD or CMOS device, lying in a horizontal plane, and an imaging lens assembly 30 operative for capturing the return imaging light scattered and/or reflected from the target being imaged along an imaging axis through the window 20, and for projecting the return captured imaging light onto the sensor array to initiate capture of an image of the target, over an imaging field of view 50A, 50B during a reading state of operation.

The imaging module 26 also includes an illuminating light assembly (not illustrated) for illuminating the target through the window 20 with illumination light from an illuminating light source, e.g., one or more light emitting diodes (LEDs) and illuminating lenses, for reflection and scattering from the target. The return imaging light is derived from the illuminating light and from ambient light. An aiming light assembly may also be provided for projecting an aiming light pattern or mark through the window 20 with aiming light from an aiming light source 34, e.g., an aiming laser or one or more LEDs, through aiming lenses 32 on the target prior to imaging. The imaging module 26 and the aiming light assembly are mounted on a printed circuit board 36. Signal processing circuitry and a programmed microprocessor or controller 60 (see FIG. 7) are operative for processing and decoding electrical signals produced by the sensor array 28 to read the target during the reading state of operation. The controller 60 also controls all the electronic components of the reader and normally maintains the reader 10 in a non-reading, e.g., a low-power or off, standby state of operation in which no target is read.

In the illustrated optical configuration, the imaging module and the aiming assembly are recessed deep within the optical compartment 24, i.e., remote from the window 20, and face an overhead stationary field mirror 38 tilted at an angle of about 45 degrees. The mirror 38 is fixedly mounted in the optical compartment 24 and is operative for folding the light paths of the light passing through the window 20 between vertical and horizontal directions. The imaging lens assembly 30 projects the captured imaging light along a vertical axis to the horizontal sensor array 28. Additional folding mirrors could also be provided.

In accordance with one aspect of this invention, an object sensing assembly 40 is also recessed within the reader 10 and is supported by a rear chassis wall 42 in spaced relation away from the window 20. The object sensing assembly 40 senses the presence of an object bearing the target in front of the window 20 by detecting return sensing light from the object through the window 20 over a sensing field of view 52A, 52B that at least partially overlaps the imaging field of view 50A, 50B, and also triggers the controller 60 to change from the standby state to the reading state upon detection of the return sensing light. The rearward, recessed mounting of the object sensing assembly 40 makes it less susceptible to interference with ambient sunlight entering the front window 20. Also, the rearward, recessed mounting of the object sensing assembly 40 makes it easier to match the object sensing field of view 52A, 52B with the imaging field of view 50A, 50B, as described below in connection with FIGS. 3-4, for increased reading performance.

Figure 5:
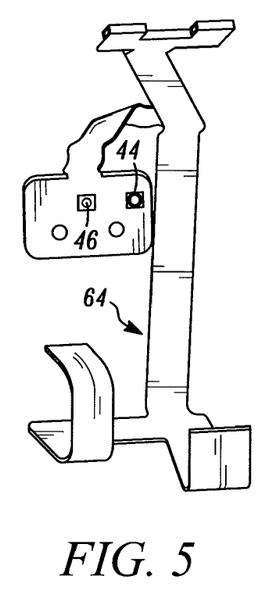
FIG. 5 is an enlarged, front perspective view of an object sensing assembly on a support in isolation in accordance with this invention.
Figure 6:
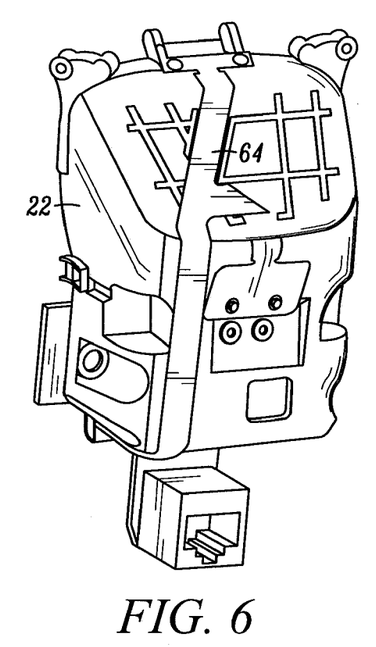
FIG. 6 is an enlarged, rear perspective view of the supported object sensing assembly of FIG. 5 mounted on a chassis for mounting in the reader of FIG. 1.
Figure 7:
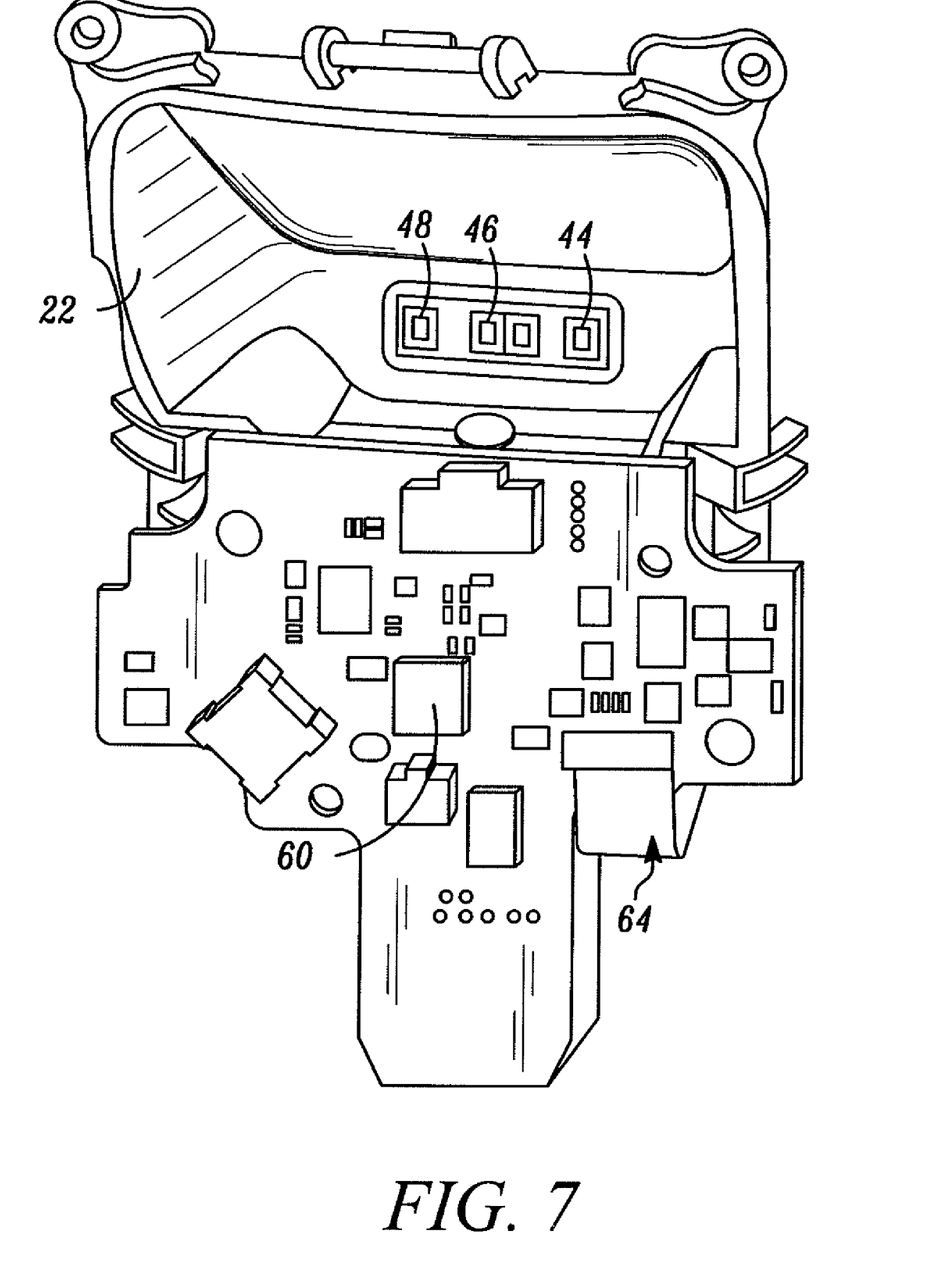
FIG. 7 is an enlarged, front perspective view of the assembly of FIG. 6.

Preferably, as best seen in FIGS. 5 and 7, the object sensing assembly 40 includes an infrared (IR) light emitter 44 to emit IR sensing light over an emission zone 54A, 54B, and an IR sensor 46 to detect the return IR sensing light. In some cases, another IR emitter, such as emitter 48 in FIG. 7, might be used for more uniform coverage of the IR sensing light over the emission zone 54A, 54B. The IR emitter 44 and the IR sensor 46 are both supported, preferably in side-by-side relation, by the rear chassis wall 42. All the emitters are IR light emitting diodes (LEDs). The controller 60 controls the IR LED 44 to emit, either pulsed or continuous, low level IR light, which is not readily seen by the human eye and, hence, will not disturb an operator or customers in the vicinity of the reader 10 while operating in the standby state. Preferably, the IR light is at the border of the optical band of human eye sensitivity. The object sensing assembly 40 preferably also includes an optical bandpass filter 66 for permitting only the return IR sensing light to reach the IR sensor 46.

Figure 3:
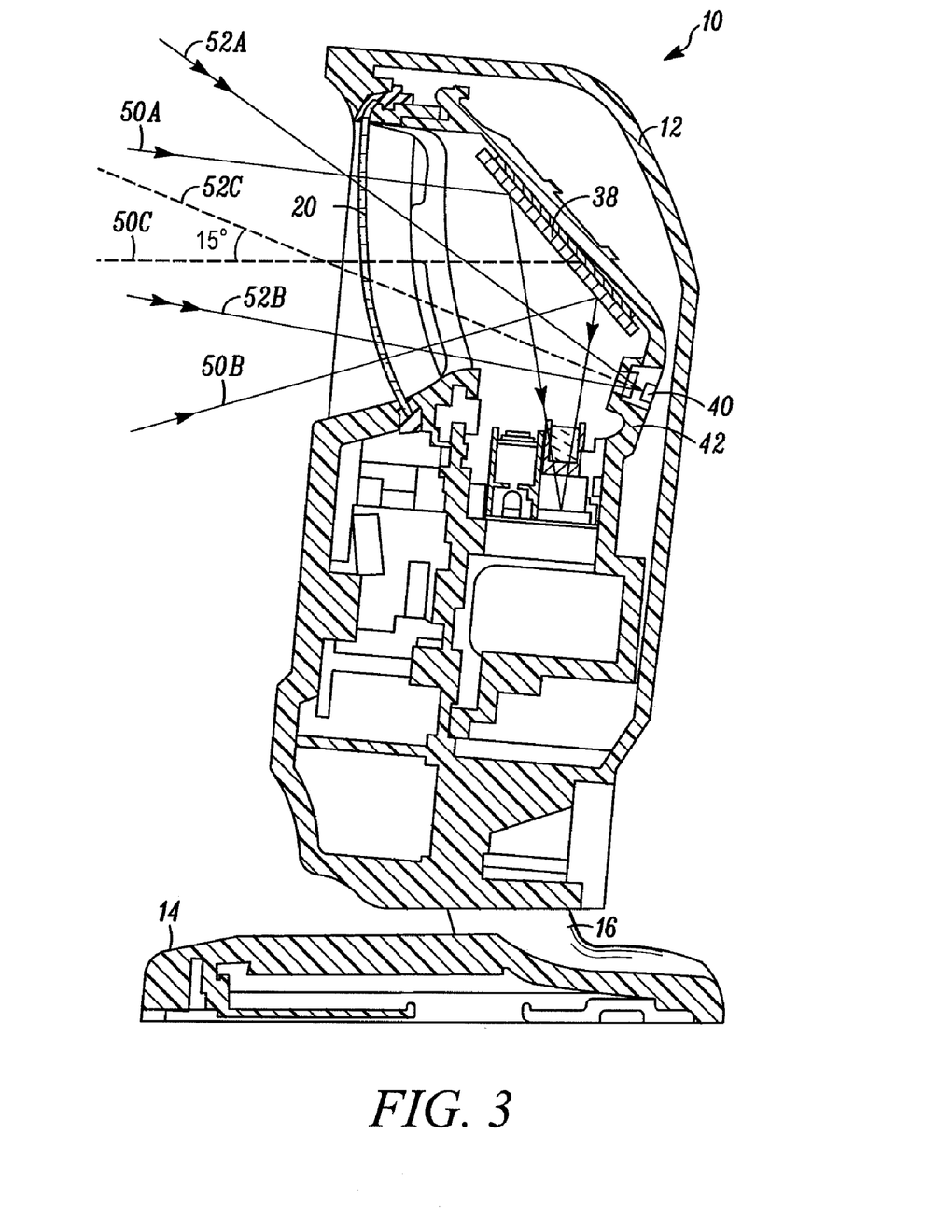
FIG. 3 is a sectional view of the reader of FIG. 1 schematically depicting the imaging field of view and the sensing field of view.
Figure 4:
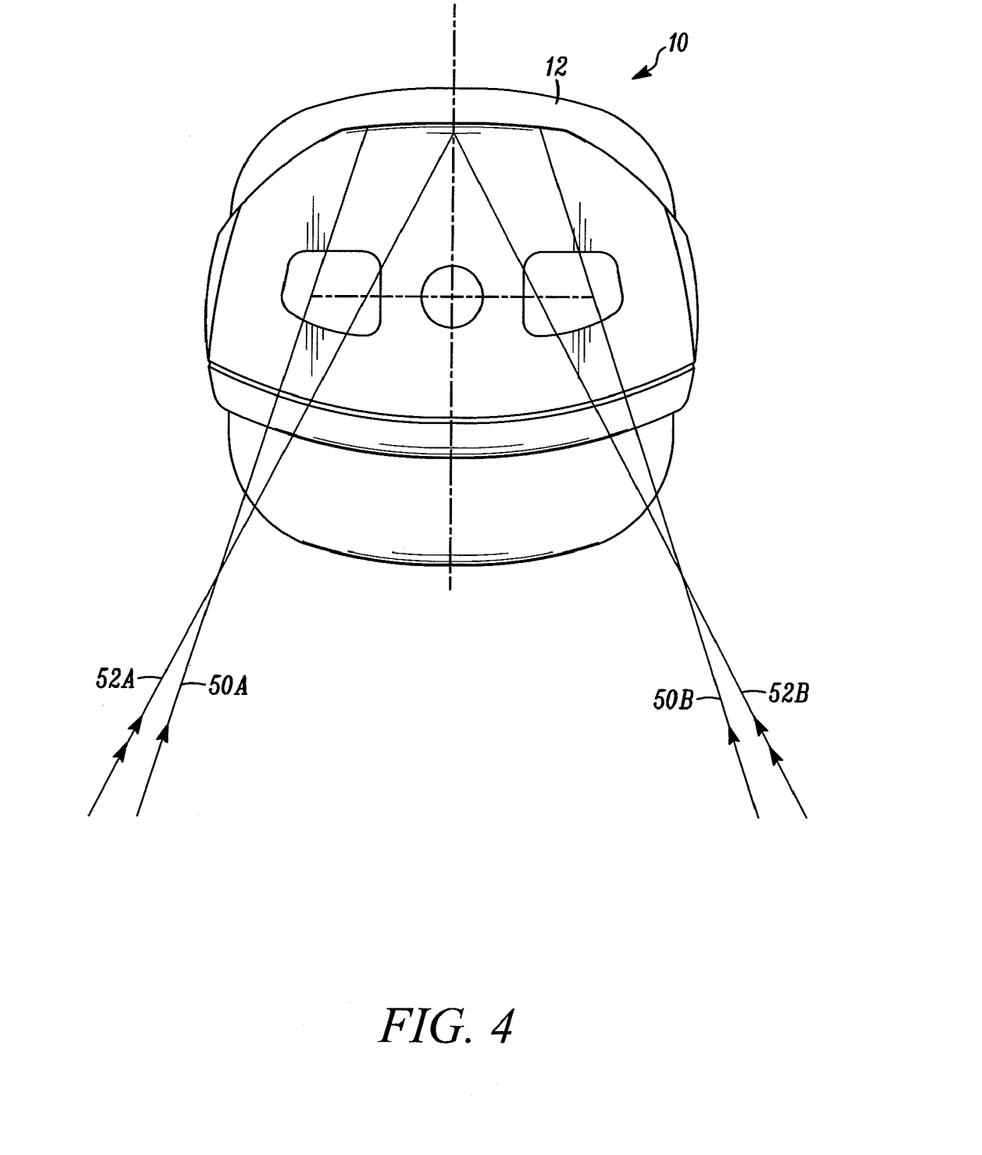
FIG. 4 is a top plan view of the of the reader of FIG. 3 schematically depicting the imaging field of view and the sensing field of view.

The rear chassis wall 42 is advantageously rearwardly tilted relative to a horizontal axis, in which case, the IR sensing light travels along a direct path that extends from the rear chassis wall 42 upwardly relative to the horizontal axis through the window 20, and the return IR sensing light travels along a direct path that extends through the window 20 downwardly relative to the horizontal axis to the rear chassis wall 42. As best seen in FIGS. 3-4, a centerline 50C of the imaging field of view 50A, 50B is horizontal, and a centerline 52C of the sensing field of view 52A, 52B is tilted at about 15 degrees relative to the horizontal centerline 50C. In this configuration, an upper zone of the sensing field of view 52A, 52B is positioned partially above the imaging field of view 50A, 50B to enable an object entering from above the reader 10 to be sensed prior to entry of the target into the imaging field of view 50A, 50B. Also, as best seen in FIG. 4, right and left zones of the sensing field of view 52A, 52B are positioned partially laterally outside of the imaging field of view 50A, 50B to enable an object entering from either side of the reader 10 to be sensed prior to entry of the target into the imaging field of view 50A, 50B. Thus, the object can be sensed slightly before entry into the imaging field of view, thereby enhancing reader performance.

Preferably, the rear chassis wall 42 has a pocket 62 in which the IR sensor 46 is received, and the pocket 62 has pocket walls bounding an aperture through which the return IR sensing light passes. The pocket walls bounding the aperture control the angular spread of the sensing field of view. Advantageously, the IR emitter 44 and the IR sensor 46, as best seen in FIG. 5, are directly mounted on a support 64, e.g., a flexible printed circuit board (PCB), and the flexible PCB 64 is directly mounted on the chassis 22. The flexible PCB 64 is situated on, and wrapped around, the rear of the chassis 22. Conductive traces on the flexible PCB 64 have not been illustrated in order not to unduly encumber the figures.

It will be understood that each of the elements described above, or two or more together, also may find a useful application in other types of constructions differing from the types described above.

While the invention has been illustrated and described as an object proximity sensor recessed in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:
1. An imaging reader for electro-optically reading targets on objects by image capture, comprising:
   a housing;
   a chassis mounted in the housing and having chassis walls bounding a front chassis opening and a chassis compartment, one of the chassis walls being a rear chassis wall;
   a window overlying the front chassis opening and being spaced from the rear chassis wall;
   an imaging module in the chassis compartment for capturing return imaging light from a target through the window over an imaging field of view, wherein the imaging module includes a solid-state imager with a sensor array of photodetectors, wherein the imaging module further includes an imaging lens assembly for projecting the captured return imaging light onto the sensor array along an upright axis perpendicular to the plane of the sensor array;
   a controller for operating the reader in a standby state of operation in which no target is read, and for processing the captured return imaging light to read the target during a reading state of operation; and
   an object sensing assembly supported by the rear chassis wall and spaced from the window, for sensing the presence of an object bearing the target in front of the window by detecting return sensing light from the object through the window over a sensing field of view that at least partially overlaps the imaging field of view, and for triggering the controller to change from the standby state to the reading state upon detection of the return sensing light.

2. The reader of claim 1, wherein the object sensing assembly includes an infrared (IR) light emitter to emit IR sensing light and an IR sensor to detect the return IR sensing light, and wherein the IR emitter and the IR sensor are both supported by the rear chassis wall.

3. An imaging reader for electro-optically reading targets on objects by image capture, comprising:
a housing;
a chassis mounted in the housing and having chassis walls bounding a front chassis opening and a chassis compartment, one of the chassis walls being a rear chassis wall;
a window overlying the front chassis opening and being spaced from the rear chassis wall;
an imaging module in the chassis compartment for capturing return imaging light from a target through the window over an imaging field of view;
a controller for operating the reader in a standby state of operation in which no target is read, and for processing the captured return imaging light to read the target during a reading state of operation;
an object sensing assembly supported by the rear chassis wall and spaced from the window, for sensing the presence of an object bearing the target in front of the window by detecting return sensing light from the object through the window over a sensing field of view that at least partially overlaps the imaging field of view, and for triggering the controller to change from the standby state to the reading state upon detection of the return sensing light;
wherein the object sensing assembly includes an infrared (IR) light emitter to emit IR sensing light and an IR sensor to detect the return IR sensing light, and wherein the IR emitter and the IR sensor are both supported by the rear chassis wall; and
wherein the rear chassis wall is rearwardly tilted relative to a horizontal axis, and wherein the IR sensing light travels along a direct path that extends from the rear chassis wall upwardly relative to the horizontal axis through the window, and wherein the return IR sensing light travels along a direct path that extends through the window downwardly relative to the horizontal axis to the rear chassis wall.

4. The reader of claim 2, wherein the object sensing assembly includes an optical bandpass filter for permitting only the return IR sensing light to reach the IR sensor.

5. An imaging reader for electro-optically reading targets on objects by image capture, comprising:
a housing;
a chassis mounted in the housing and having chassis walls bounding a front chassis opening and a chassis compartment, one of the chassis walls being a rear chassis wall;
a window overlying the front chassis opening and being spaced from the rear chassis wall;
an imaging module in the chassis compartment for capturing return imaging light from a target through the window over an imaging field of view;
a controller for operating the reader in a standby state of operation in which no target is read, and for processing the captured return imaging light to read the target during a reading state of operation;
an object sensing assembly supported by the rear chassis wall and spaced from the window, for sensing the presence of an object bearing the target in front of the window by detecting return sensing light from the object through the window over a sensing field of view that at least partially overlaps the imaging field of view, and for triggering the controller to change from the standby state to the reading state upon detection of the return sensing light;
wherein the object sensing assembly includes an infrared (IR) light emitter to emit IR sensing light and an IR sensor to detect the return IR sensing light, and wherein the IR emitter and the IR sensor are both supported by the rear chassis wall; and
wherein the rear chassis wall has a pocket in which the IR sensor is received, and wherein the pocket has pocket walls bounding an aperture through which the return IR sensing light passes.

6. The reader of claim 2, wherein the IR emitter and the IR sensor are supported in side-by-side relation by the rear chassis wall.

7. The reader of claim 2, and further comprising a support on which the IR emitter and the IR sensor are mounted, and wherein the support is mounted on the chassis.

8. An imaging reader for electro-optically reading targets on objects by image capture, comprising:
a housing;
a chassis mounted in the housing and having chassis walls bounding a front chassis opening and a chassis compartment, one of the chassis walls being a rear chassis wall;
a window overlying the front chassis opening and being spaced from the rear chassis wall;
an imaging module in the chassis compartment for capturing return imaging light from a target through the window over an imaging field of view;
a controller for operating the reader in a standby state of operation in which no target is read, and for processing the captured return imaging light to read the target during a reading state of operation;
an object sensing assembly supported by the rear chassis wall and spaced from the window, for sensing the presence of an object bearing the target in front of the window by detecting return sensing light from the object through the window over a sensing field of view that at least partially overlaps the imaging field of view, and for triggering the controller to change from the standby state to the reading state upon detection of the return sensing light; and
wherein the imaging module includes a sensor array lying in a horizontal plane, and an imaging lens assembly for projecting the captured return imaging light onto the sensor array along an upright axis perpendicular to the plane of the sensor array; and further comprising a mirror in the chassis compartment for directing the return imaging light along a folded path to the imaging lens assembly.

9. The reader of claim 1, wherein a zone of the sensing field of view is outside of the imaging field of view to enable the object to be sensed prior to entry of the target into the imaging field of view.

10. The reader of claim 1, and further comprising a base for supporting the housing in a hands-free mode of operation on a support surface.

11. A method of electro-optically reading targets on objects by image capture, the method comprising the steps of:
mounting a chassis in a housing;
configuring the chassis with chassis walls bounding a front chassis opening and a chassis compartment, one of the chassis walls being a rear chassis wall;
overlying the front chassis opening with a window spaced from the rear chassis wall;
capturing return imaging light from the target through the window over an imaging field of view with a solid-state imager having a sensor array of photodetectors after the return m main lens assembly;
operating the reader in a standby state of operation in which no target is read;
processing the captured return imaging light to read the target during a reading state of operation; and
sensing the presence of an object bearing the target in front of the window with an object sensing assembly supported on the rear chassis wall and spaced from the window by detecting return sensing light from the object through the window over a sensing field of view that at least partially overlaps the imaging field of view; and
triggering the controller to change from the standby state to the reading state upon detection of the return sensing light.

12. The method of claim 11, wherein the sensing step is performed by an infrared (IR) light emitter that emits IR sensing light and by an IR sensor that detects the return IR sensing light, and supporting both the IR emitter and the IR sensor by the rear chassis wall.

13. A method of electro-optically reading targets on objects by image capture, the method comprising the steps of:
mounting a chassis in a housing;
configuring the chassis with chassis walls bounding a front chassis opening and a chassis compartment, one of the chassis walls being a rear chassis wall;
overlying the front chassis opening with a window spaced from the rear chassis wall;
capturing return imaging light from the target through the window over an imaging field of view;
operating the reader in a standby state of operation in which no target is read;
processing the captured return imaging light to read the target during a reading state of operation; and
sensing the presence of an object bearing the target in front of the window with an object sensing assembly supported on the rear chassis wall and spaced from the window by detecting return sensing light from the object through the window over a sensing field of view that at least partially overlaps the imaging field of view;
triggering the controller to change from the standby state to the reading state upon detection of the return sensing light
wherein the sensing step is performed by an infrared (IR) light emitter that emits IR sensing light and by an IR sensor that detects the return IR sensing light, and supporting both the IR emitter and the IR sensor by the rear chassis wall; and
rearwardly tilting the rear chassis wall relative to a horizontal axis, and directing the IR sensing light to travel along a direct path that extends from the rear chassis wall upwardly relative to the horizontal axis through the window, and directing the return IR sensing light to travel along a direct path that extends through the window downwardly relative to the horizontal axis to the rear chassis wall.

14. The method of claim 12, and permitting only the return IR sensing light to reach the IR sensor by positioning an optical bandpass filter in front of the IR sensor.

15. A method of electro-optically reading targets on objects by image capture, the method comprising the steps of:
mounting a chassis in a housing;
configuring the chassis with chassis walls bounding a front chassis opening and a chassis compartment, one of the chassis walls being a rear chassis wall;
overlying the front chassis opening with a window spaced from the rear chassis wall;
capturing return imaging light from the target through the window over an imaging field of view;
operating the reader in a standby state of operation in which no target is read;
processing the captured return imaging light to read the target during a reading state of operation; and
sensing the presence of an object bearing the target in front of the window with an object sensing assembly supported on the rear chassis wall and spaced from the window by detecting return sensing light from the object through the window over a sensing field of view that at least partially overlaps the imaging field of view;
triggering the controller to change from the standby state to the reading state upon detection of the return sensing light;
wherein the sensing step is performed by an infrared (IR) light emitter that emits IR sensing light and by an IR sensor that detects the return IR sensing light, and supporting both the IR emitter and the IR sensor by the rear chassis wall; and
configuring the rear chassis wall with a pocket in which the IR sensor is received, and configuring the pocket with pocket walls bounding an aperture through which the return IR sensing light passes.

16. The method of claim 12, and supporting the IR emitter and the IR sensor in side-by-side relation by the rear chassis wall.

17. The method of claim 12, and mounting the IR emitter and the IR sensor on a support, and mounting the support on the chassis.

18. A method of electro-optically reading targets on objects by image capture, the method comprising the steps of:
mounting a chassis in a housing;
configuring the chassis with chassis walls bounding a front chassis opening and a chassis compartment, one of the chassis walls being a rear chassis wall;
overlying the front chassis opening with a window spaced from the rear chassis wall;
capturing return imaging light from the target through the window over an imaging field of view;
operating the reader in a standby state of operation in which no target is read;
processing the captured return imaging light to read the target during a reading state of operation; and
sensing the presence of an object bearing the target in front of the window with an object sensing assembly supported on the rear chassis wall and spaced from the window by detecting return sensing light from the object through the window over a sensing field of view that at least partially overlaps the imaging field of view;
triggering the controller to change from the standby state to the reading state upon detection of the return sensing light; and
wherein the capturing step is performed by a sensor array lying in a horizontal plane, and by an imaging lens assembly that projects the captured return imaging light onto the sensor array along an upright axis perpendicular to the plane of the sensor array; and directing the return imaging light along a folded path to the imaging lens assembly.

19. The method of claim 11, and positioning a zone of the sensing field of view to lie outside of the imaging field of view to enable the object to be sensed prior to entry of the target into the imaging field of view.

20. The method of claim 11, and mounting the housing on a base that rests on a support surface in a hands-free mode of operation.

* * * * *

UNITED STATES PATENT AND TRADEMARK OFFICE
CERTIFICATE OF CORRECTION

PATENT NO. : 8,342,409 B2
APPLICATION NO. : 12/900829
DATED : January 1, 2013
INVENTOR(S) : Handshaw et al.

It is certified that error appears in the above-identified patent and that said Letters Patent is hereby corrected as shown below:

In the Claims:

In Column 9, Line 2, in Claim 11, delete "return m main lens assembly;" and insert -- return imaging light is projected through an imaging lens assembly; --, therefor.

In Column 9, Line 42, in Claim 13, delete "light" and insert -- light; --, therefor.

Signed and Sealed this
Twenty-eighth Day of May, 2013

Teresa Stanek Rea
*Acting Director of the United States Patent and Trademark Office*